United States Patent [19]

Ohlendorf et al.

[11] Patent Number: 4,845,737
[45] Date of Patent: Jul. 4, 1989

[54] METHOD FOR MEASURING LINE PARAMETERS OF SUBSCRIBER LINES OF A TELECOMMUNICATION SYSTEM

[75] Inventors: Guenter Ohlendorf, Muensing, Fed. Rep. of Germany; James Elvidge, Lawrence, Mass.

[73] Assignee: Siemens Aktiengesellschaft, Berlin and Munich, Fed. Rep. of Germany

[21] Appl. No.: 229,576

[22] Filed: Aug. 8, 1988

[30] Foreign Application Priority Data

Aug. 7, 1987 [DE] Fed. Rep. of Germany ....... 3726356

[51] Int. Cl.$^4$ .......................... H04B 3/46; H04M 1/24
[52] U.S. Cl. ...................................... 379/30; 324/606; 324/541; 324/523
[58] Field of Search ............................. 379/30, 24, 22; 324/60 R, 60 C, 60 CD, 541, 523

[56] References Cited

U.S. PATENT DOCUMENTS 2,414,624  1/1947  Wilson ................................. 379/30

Primary Examiner—Stafford D. Schreyer
Attorney, Agent, or Firm—David N. Caracappa

[57] ABSTRACT

A method for measuring line parameters of subscriber lines of a telecommunication system in which end devices, exhibiting a capacitance, are connected to two wires of the subscriber lines is disclosed. The line parameters measured include the capacitances between each of the line wires and ground, the capacitance between the line wires, the leakage resistances between each of the line wires and ground, and the insulating resistance between the line wires. This task is accomplished by performing the following steps while the end device is connected to the subscriber lines. These steps are performed in three measuring configurations sequentially: first one of the two wires of the subscriber line is grounded and the measurement is performed in connection with the other, then the other one of the two wires is grounded and the measurement is performed in connection with the first, and then both wires of the subscriber line are connected together and the measurement is performed on the pair. First, an impulse voltage is impressed through a charging resistance. Then the wire or wires in the particular measuring configuration is discharged through a discharge resistance coupled to ground. At discrete points in time the corresponding resulting voltage values are measured. On the basis of the measured values obtained thereby, the known values of the line resistance and capacitance of the end device and relationship of the line parameters to the known values and the measured values, the values of these line parameters are determined.

3 Claims, 2 Drawing Sheets

METHOD FOR MEASURING LINE PARAMETERS OF SUBSCRIBER LINES OF A TELECOMMUNICATION SYSTEM

The invention relates to a method for measuring line parameters of subscriber lines of a telecommunication system.

In order to be able to ensure operational quality of public telecommunications systems it is necessary, and also provided for by International recommendations, to check the subscriber lines of such systems as a matter of routine. During such routine checks, external voltages on the subscriber line wires, insulation resistances between the wires and between each wire and ground and capacitances between the wires and between each wire and ground are measured.

Until now the procedure was that for the determination of each individual parameter a separate measuring system was connected to the subscriber line to be checked. In this process it was necessary to wait until the resulting transient state had died down. The extension of the measuring time resulting therefrom is not a negligible factor, given the frequency at which, according to the International recommendations, such routine tests should be done.

The object of the invention is a measuring method of the above mentioned kind which rapidly leads to the particular measuring results.

According to the invention this task is accomplished by performing the following steps while the end devices are connected to the subscriber lines. These steps are performed in three measuring configurations sequentially: first, one of the two wires of the subscriber line is grounded and the measurement is performed in connection with the other, then the other one of the two wires is grounded and the measurement is performed in connection with the first, and then both wires of the subscriber line connected together and the measurement is performed in connection with the pair. First, an impulse voltage is impressed through a charging resistance. The wire or wires in the particular measuring configuration is then discharged through a discharge resistance coupled to ground. At discrete points in time the corresponding resulting voltage values are measured. On the basis of the measured values obtained thereby, the known values for the line resistance and capacitance of the end device and the relationship among the known values, the measured values and the line parameters, the values of these line parameters are determined.

Hence, the invention is based on the idea of considering the subscriber line and its connected subscriber end device as a two terminal device with complex impedance. By referring to a simplified equivalent circuit diagram of such a two terminal device, which includes the characteristic resistance and capacitance of the line and the resistance and capacitance of the end device, a system of n equations can be written. Based upon these equations, the values for the n line parameters can be determined. If in accordance with a further development of the invention, a digital signal processor is used, this determination may be carried out particularly rapidly.

Rough values for the line parameters determined in the above manner are sufficiently accurate for a routine check. In accordance with a further aspect of the invention, these rough values may be further refined for the purpose of error location or rechecking of repaired subscriber lines. This may be done by using the determined rough values of the line parameters to set the values of the coefficients of a digital filter imitating the structure of the equivalent circuit diagram of the subscriber lines. Thereupon, the previously mentioned measurements are repeated on the subscriber line and on the digital filter and the respective resulting values obtained for the voltages compared with each other. On the basis of the results of the comparison, correction values for the filter coefficients are determined according to which the filter coefficients are changed. The measurement comparison and correction steps are repeated until the coefficient changes obtained in the process fall below a given limit value. From the final values of the filter coefficients, the final values of the mentioned line parameters are derived.

Below the invention is explained in greater detail in conjunction with an embodiment with reference to a drawing in which.

Figure 1:
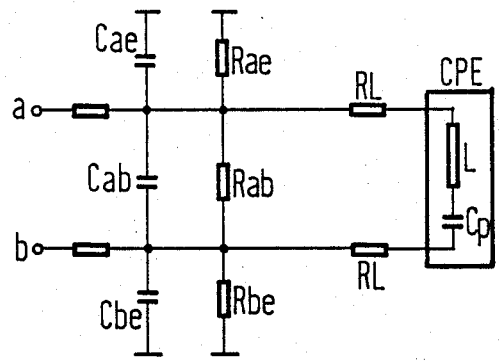
FIG. 1 is a simplified equivalent circuit diagram of a subscriber line with a connected subscriber end device.

The equivalent circuit diagram shown in FIG. 1 is simplified insofar as the resistances Rae and Rbe between line wires a and b and ground, respectively, represent, in fact, the parallel connection of the leakage resistance and resistances between the wires of the subscriber line and the connections of a feed voltage source at the feed potential. Furthermore, ac voltage strays on the subscriber lines have been left out of consideration. Rab denotes the insulating resistance between the line wires and RL denotes the line resistance. Cae and Cbe stand for the capacitance between the line wires and ground and Cab for the capacitance between the line wires. L and Cp are the inductance and capacitance of the end user device CPE connected to the subscriber line. For the measuring accuracy required, such a simplified equivalent circuit diagram is sufficient.

Figure 2:
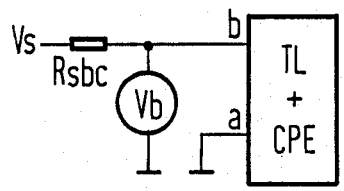
FIGS. 2 to 7 are block diagrams illustrating 6 different measuring configurations.

When carrying out the method according to the invention, a first step is performed in a measuring configuration shown in FIG. 2. Wire a is grounded and an impulse voltage Vs is impressed via a charge resistance Rsbc on wire b of the subscriber line. The impulse response Vb measured in the process on the b wire at a discrete time depends on the line parameters of the leakage resistances Rae and Rbe, the insulating resistance Rab, the capacitances between the respective line wires and ground Cae and Cbe, and the capacitance between the line wires Cab as illustrated in FIG. 1 according to the following equation:

$$Vb = f1\ (C'' + Cbe,\ Rsbc,\ R'b) \qquad (1)$$

where $C'' = Cab + Cp$; $R'b = Rab\ ||\ Rbe$ and $R'a = Rab\ ||\ Rae$.

Figure 3:
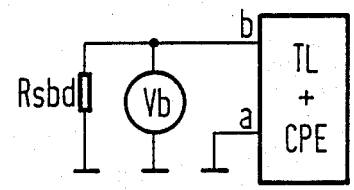

In a second step, in a measuring configuration shown in FIG. 3, wire a is still grounded, and wire b is discharged through a discharge resistance Rsbd. The relationship among the discharge voltage measured at a discrete time, the line parameters, and the discharge resistance may be expressed mathematically:

$$Vb = f2\ (C'' + Cbe,\ R'b,\ Rsbd) \qquad (2)$$

Figure 4:
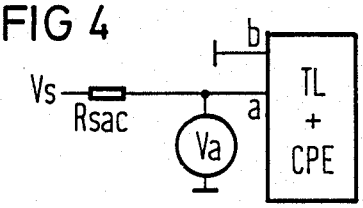

In a third step, in a measuring configuration shown in FIG. 4, wire b is connected to ground, and an impulse voltage Vs is impressed on wire a via the charging resistance Rsac. The resulting impulse response Va is measured, and has the following relationship to the line parameters and the charging resistance:

$$Va = f3\ (C'' + Cae,\ Rsac,\ R'a) \qquad (3)$$

Figure 5:
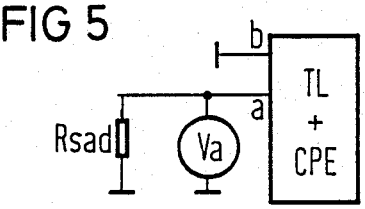

In a fourth step, in a measuring configuration shown in FIG. 5, wire b is still grounded, and wire a is discharged through a discharge resistance Rsad. The discharge voltage Va measured at a discrete point in time is a function of the line parameters and the discharge resistance in the following way:

$$Va = f4\ (C'' + Cae,\ R'a,\ Rsad) \qquad (4)$$

Figure 6:
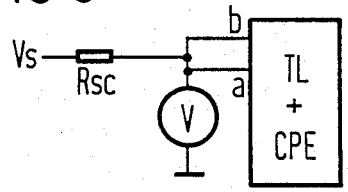

In a fifth step, in a measuring configuration shown in FIG. 6, the two line wires a and b of the subscriber line are connected together. An impulse voltage Vs is impressed on the two wires through a charging resistance Rsc. The impulse response V measured at a discrete time bears the following relationship to the line parameters and the charging resistance:

$$V = f5\ (Cae + Cbe,\ Rsc,\ Rae\ ||\ Rbe) \qquad (5)$$

Figure 7:
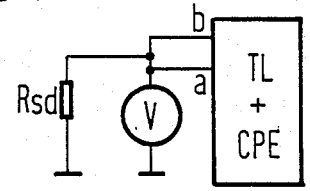

In a last step, in a measuring configuration shown in FIG. 7, the line wires a and b are still connected together and are discharged through a discharge resistance Rsd. The discharge voltage V measured at a discrete time is related to the line parameters and the discharge resistance in the following way:

$$V = f6\ (Cae + Cbe,\ Rae\ ||\ Rbe,\ Rsd) \qquad (6)$$

From the values obtained in the previously mentioned six measurements, and the stated interrelationships among the measured values, the line parameters and the known variables, specifically the charging and discharging resistances Rc and Rd respectively, and the capacitance Cp of the end user device CPE, six equations are available for the six unknowns: the insulating resistance Rab, the leakage resistances Rae and Rbe, the capacitance between the line wires Cab and the capacitances Cae and Cbe between one line wire and ground. The values for these six line parameters, therefore, can be calculated.

Figure 8:
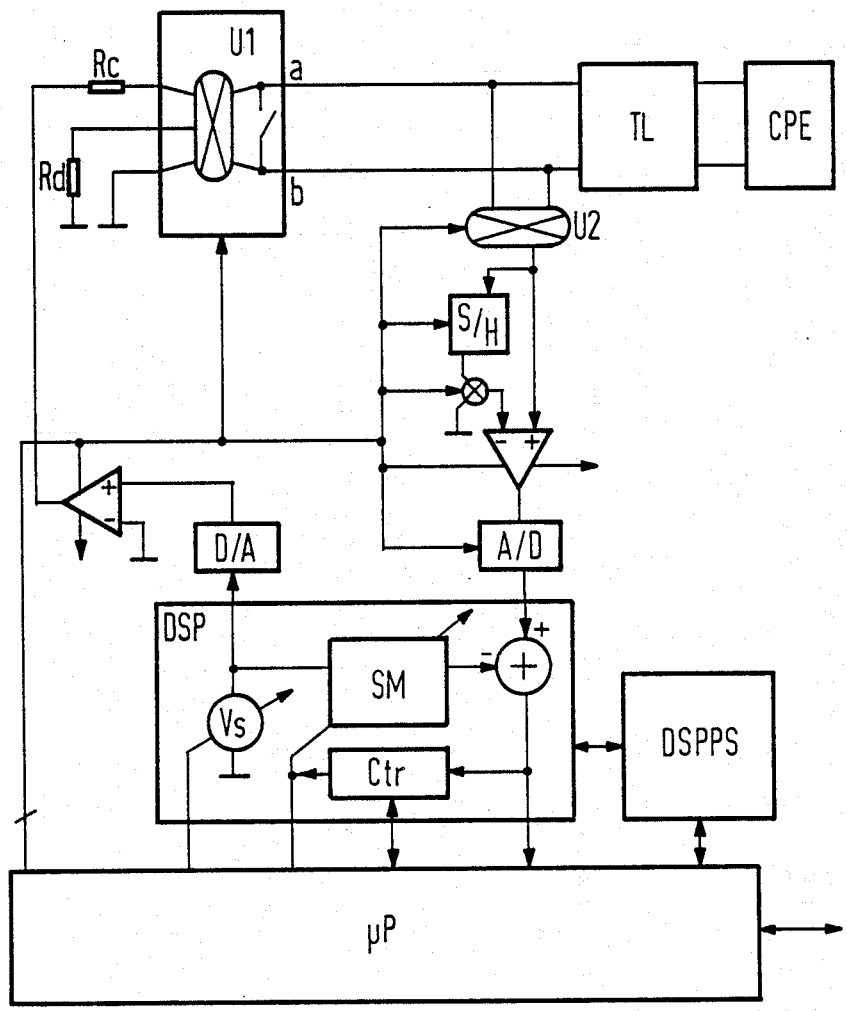
FIG. 8 is a block diagram of a circuit for carrying out the method according to the invention.

FIG. 8 shows a circuit for carrying out the method according to the invention. A change-over switch U1 is controlled by a digital signal processor μP. The various measuring configurations are established by means of this change-over switch U1. In FIG. 8, wires a and b of the subscriber line TL, terminate in an end user device CPE. In a first configuration of change-over switch U1, a selected one of the wires a and b has an impulse voltage impressed on it, through a charging resistance Rc. The impulse voltage is supplied by a series connection of a voltage source VS, and a digital to analog converter D/A. In a second configuration, a selected one of the wires a and b is coupled to a discharge resistance Rd connected to ground. And in a third configuration the two wires a and b are connected together.

The impulse response is sampled at discrete times by means of the combination of a second change-over switch U2, a sample and hold circuit S/H, and an analog to digital converter A/D. The digitized samples are supplied to the digital signal processor μP, which then carries out the previously mentioned calculation to determine the parameter values on the basis of the totality of the measuring results.

With the above indicated method, only rough values for the line parameters can be determined which, however, suffice for carrying out routine measurements. As already indicated, these rough values may be further refined according to a further aspect of the invention. The configuration illustrated in FIG. 8 has, to this end, a device DSP with a program storage DSPPS, which includes a digital filter SM which can emulate the equivalent circuit diagram of the subscriber line illustrated in FIG. 1.

The coefficients of this digital filter are initially set according to the rough values of the line parameters determined in the previously mentioned steps. Subsequently, the six measurements in connection with wires a and b of the subscriber line TL are repeated. In addition, simulated measurements are made in connection with the digital filter emulating the subscriber line. The resulting values for line parameters are compared with each other. According to the results of this comparison, a correction factor for the coefficient of the digital filter is calculated with the cooperation of a control Ctr of the digital filter. The coefficients of the filter are then corrected. This entire procedure is repeated until correction factors result which fall below a given limit value. On the basis of the final coefficients of the digital filter, the fine values for the line parameters are determined.

In an appendix, the equations are given which indicate the interrelationships between the impulse responses resulting from the use of the mentioned measuring configurations, the known line variables, and the line parameters to be determined.

APPENDIX

To FIG. 2:

$$Vb(t) = L^{-1}\left(Vs(DC)\frac{N2s^2 + N1s + N0}{s(D3s^3 + D2s^2 + D1s + D0)}\right)$$

where
$L^{-1}$ = Inverse Laplace Transformation
$N2$ = GsbcLCp
$N1$ = Gsbc2RLCp
$N0$ = Gsbc
$D3$ = LCp(Cab + Cbe)
$D2$ = LCp(Gsbc + Gbe + Gab) + 2RLCp(Cab + Cbe)
$D1$ = 2RLCp(Gsbe + Gbe + Gab) + (Cab + Cbe + Cp)D0
$D0$ = Gsbc + Gbe + Gab
$G$ = 1/R
$Gb'$ = Gab + Gbe
$Ga'$ = Gab + Gae
$C''$ = Cp + Cab
$Cb''$ = Cbe + C''
$Ca''$ = Cae + C''

By approximation:
$$Vb(t) = Eb(I - e^{\delta 1 t})$$
where
$$\delta 1 = -\frac{Gsbc + Gb'}{2RLCp(Gsbc + Gb') + Cb''}$$
and
$$Eb = Vs(DC)\frac{Gsbe}{Gsbe + Gbe + Gab}$$

To FIG. 3:

$Vb(t) =$

APPENDIX-continued $$L^{-1}\left(\frac{V_{ib}(2RLC_p(C_{be}+C_b)s + C_b'')}{2RLC_p(C_{be}+C_{ab})s^2) + (2RLC_p(G_b'+G_{sbd})+C''b)s + G_b' + G_{sbd}}\right)$$

where $V_{ib}$ is the voltage at wire b before discharge

By approximation:
$$V_b(t) = V_{ib}\, e^{\delta_2 t}$$

with
$$\delta_2 = -\frac{G_{sbd}+G_b'}{2RLC_p(G_b'+G_{sbd})+C_b''}$$

To FIG. 4 (analogous to FIG. 2):
$$V_a(t) = E_a(1 - e^{\delta_3 t})$$

with
$$\delta_3 = -\frac{G_{sbc}+G_a'}{2RLC_p(G_{sbc}+G_a')+C_a''}$$

To FIG. 5 (analogous to FIG. 3):
$$V_a(t) = V_{ia}\, e^{\delta_4 t}$$

with
$$\delta_4 = -\frac{G_{sad}+G_a'}{2RLC_p(G_a'+G_{sad})+C_a''}$$

To FIG. 6:
$$V(t) \doteq \frac{V_s G_{sc}}{G_{be}+G_{ae}+G_{se}}(1 - e^{\delta_5 t})$$

with
$$\delta_5 = -\frac{G_{sc}+G_{be}+G_e}{C_{ae}+C_{be}}$$

To FIG. 7:
$$V(t) = V_i e^{\delta_6 t}$$

with
$$\delta_6 = -\frac{G_{sd}+G_{be}+G_{ae}}{C_{ae}+C_{be}}$$

What we claim is:

1. A method for measuring line parameters of subscriber lines of a telecommunication system in which end devices, exhibiting a capacitance, are connected to two wires of said subscriber lines, said line parameters including the capacitances between each of said line wires and ground, the capacitance between said line wires, the leakage resistances between each of said line wires and ground, and the insulating resistance between said line wires, said method comprising the steps of:
   (a) coupling a one of said wires to ground and performing the following steps in connection with the other one of said wires:
      (i) impressing an impulse voltage through a charging resistance on the ungrounded one of said wires of the subscriber line;
      (ii) discharging said wire through a discharge resistance coupled to ground; and
      (iii) measuring the corresponding resulting voltage values at discrete times;
   (b) coupling the other one of said wires to ground, and repeating steps i through iii in connection with said one of said wires;
   (c) coupling said wires together and repeating steps i through iii in connection with both said wires; and
   (d) determining the values of said line parameters on the basis of the thereby obtained measured values, the known values for said charging and discharging resistances, respectively, the capacitance of the end device, and the relationships between said measured values, said known values and said line parameters.

2. The method of claim 1, wherein the determination of the values of the line parameters takes place with a digital signal processor.

3. The method of either of claims 1 and 2, wherein said method further comprises the steps of:
   (e) utilizing the determined values of said line parameters to set the coefficients of a digital filter emulating the structure of an equivalent circuit of said subscriber line;
   (f) repeating steps a through d on said subscriber line;
   (g) simulating steps a through d on said digital filter;
   (h) comparing the values from steps f and g with each other and on the basis of the results of the comparison determining correction values for said filter coefficients according to which the filter coefficients are changed;
   (i) repeating steps (e), (f) (g) and (h) until the coefficient change resulting thereby falls below a given limit value; and
   (j) deriving final values of said line parameters from final values of the filter coefficients from step (i).

* * * * *